United States Patent
Bourse et al.

(10) Patent No.: US 12,192,354 B2
(45) Date of Patent: Jan. 7, 2025

(54) CRYPTOGRAPHIC METHOD OF SECURE COMPARISON OF TWO SECRET DATA X AND Y

(71) Applicant: ORANGE, Issy-les-Moulineaux (FR)

(72) Inventors: Florian Bourse, Chatillon (FR); Olivier Sanders, Chatillon (FR); Jacques Traore, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 528 days.

(21) Appl. No.: 17/278,861

(22) PCT Filed: Sep. 20, 2019

(86) PCT No.: PCT/FR2019/052213
§ 371 (c)(1),
(2) Date: Mar. 23, 2021

(87) PCT Pub. No.: WO2020/065185
PCT Pub. Date: Apr. 2, 2020

(65) Prior Publication Data
US 2022/0038277 A1 Feb. 3, 2022

(30) Foreign Application Priority Data
Sep. 24, 2018 (FR) ...................................... 1858677

(51) Int. Cl.
*H04L 29/06* (2006.01)
*H04L 9/06* (2006.01)
*H04L 9/30* (2006.01)

(52) U.S. Cl.
CPC ............ *H04L 9/302* (2013.01); *H04L 9/0643* (2013.01); *H04L 2209/046* (2013.01); *H04L 2209/46* (2013.01)

(58) Field of Classification Search
CPC ... H04L 9/30; H04L 9/0643; H04L 2209/046; H04L 2209/46
See application file for complete search history.

(56) References Cited

U.S. PATENT DOCUMENTS 10,009,378 B2 * 6/2018 Chiviendacz ........... G06F 21/40
2016/0261409 A1 * 9/2016 French ...................... H04L 9/00

OTHER PUBLICATIONS

Rhys Carlton, Secure Integer Comparisons Using the Homomorphic Properties of Prime Power Subgroups, Thesis, University of Western Ontario (Year: 2017).*

(Continued)

*Primary Examiner* — Shin-Hon (Eric) Chen
*Assistant Examiner* — Vladimir I Gavrilenko
(74) *Attorney, Agent, or Firm* — David D. Brush; Westman, Champlin & Koehler, P.A.

(57) ABSTRACT

A cryptographic method including: generating by a first device having a datum x an RSA module N; computing by the first device a number $C=g^{b^{a \cdot x}}h1$, g being an element of sub-group G of order $b^d$, h1 being an element of sub-group H of order f, and a, b, d, f being integers, b and f being mutually prime, and x and y being less than d/a; sending C to a second device having datum y; computing by the second device $D=C^{u \cdot b^{d-ay}}(gh3)^v h2$, u and v being random numbers and h2 and h3 being elements of H, and a first fingerprint $(gh3)^v$; sending to the first device, D and the first fingerprint; computing by the first device $(D^f)^{f'}$, $f'=1/f$; obtaining based on $(D^f)^{f'}$ a second fingerprint; and determining whether x is greater than or equal to y or x is less than y by comparing the first and the second fingerprints.

13 Claims, 2 Drawing Sheets

(56) References Cited

OTHER PUBLICATIONS

"Secure Hash Standard", FIPS PUB 180-4, DOI: http://dx.doi.org/10.6028/NIST.FIPS.180-4, published Aug. 2015.
Elaine Barker, "Recommendation for Key Management", NIST Special Publication 800-57 Part 1 Revision 4, DOI: http://dx.doi.org/10.6028/NIST.SP.800-57pt1r4, Jan. 2016.
Carlton, R., et al., "Threshold Properties of Prime Power Subgroups with Application to Secure Integer Comparisons", CT-RSA 2018, pp. 137-156, Mar. 2018.
English translation of the Written Opinion of the International Searching Authority dated Dec. 18, 2019 for corresponding International Application No. PCT/FR2019/052213, filed Sep. 20, 2019.
International Search Report dated Dec. 9, 2019 for corresponding International Application No. PCT/FR2019/052213, Sep. 20, 2019.
Written Opinion of the International Searching Authority dated Dec. 9, 2019 for corresponding International Application No. PCT/FR2019/052213, filed Sep. 20, 2019.
French Search Report dated Jun. 27, 2019 for corresponding French Application No. 1858677, filed Sep. 24, 2018.
Carlton Rhys et al., "Threshold Properties of Prime Power Subgroups with Application to Secure Integer Comparisons", International Conference on Computer Analysis of Images and Patterns. CAIP 2017: Computer Analysis of Images and Patterns; [Lecture Notes in Computer Science; Lect. Notes Computer], Springer, Berlin, Heidelberg, pp. 137-156, Mar. 7, 2018 (Mar. 7, 2018), ISBN: 978-3-642-17318-9 XP047471610.
Geoffroy Couteau, "Efficient Secure Comparison Protocols", International Association for Cryptologic Research, vol. 20160601:071706, May 31, 2016 (May 31, 2016), pp. 1-34, XP061021038.

\* cited by examiner

CRYPTOGRAPHIC METHOD OF SECURE COMPARISON OF TWO SECRET DATA X AND Y

This Application is a Section 371 National Stage Application of International Application No. PCT/FR2019/052213, filed Sep. 20, 2019, the content of which is incorporated herein by reference in its entirety, and published as WO 2020/065185 on Apr. 2, 2020, not in English.

BACKGROUND OF THE INVENTION

The invention relates to the general field of telecommunications and more specifically of cryptography.

It relates to a cryptographic method of secure comparison of two data respectively possessed by two separate entities and kept secret by them. In other words, neither of the entities is in possession of the two data to proceed directly to their comparison, for example bitwise.

The invention is applicable to many fields, such as for example healthcare or cybersecurity, which increasingly rely on machine learning algorithms using ranking techniques making it possible to automate data processing. One of the most important tasks that must be carried out during the ranking of data is the comparison of the data. However, the data to be compared may sometimes be sensitive data, such as for example banking or healthcare data gathered from customers, which the latter may not wish to make public, which makes their direct comparison difficult.

Cryptography makes it possible to efficiently reconcile these divergent interests using secure multi-party computation techniques offering the possibility of comparing two integers with one another. In general, these techniques consider two separate entities A and B, respectively possessing secret data x and y appearing in the form of integer numbers, and seeking to assess a certain function of x and y without revealing these data to compare these data. This problem, complex to solve, is known by the name of "millionaire's problem": two millionaires Alice and Bob each have a sum x and a sum y, respectively and each seeks to know which of them is the richest without revealing to the other the sum they have.

Various cryptographic algorithms have been proposed to solve this problem.

A first category of algorithms is based on so-called garbled circuits. The chosen approach consists in breaking down the two secret data x and y in a binary representation and securely comparing these representations by means of a Boolean circuit. These algorithms suffer from high complexity, particularly in terms of required interactions.

A second category of algorithms, less complex to implement, relies on homomorphic encryption techniques. An example of such an algorithm is described in the document by Carlton and al. titled "Threshold Properties of Prime Power Subgroups with Application to Secure Integer Comparisons", CT-RSA 2018, pages 137-156, March 2018. This algorithm is based on four passes between the entities A and B leading to the exchange between the two entities of different computation results using two separate homomorphic encryption algorithms, and allowing one of them, via a final equality test, to determine which of the two secret data x or y is greater than the other. The advantage of this algorithm is that it does not require the secret data x and y to be compared bitwise unlike algorithms using garbled circuits. However, it is still fairly complex, requiring four passes between the entities A and B, the use of two different homomorphic encryption algorithms, and high-cost computations of discrete logarithms.

SUBJECT AND SUMMARY OF THE INVENTION

The invention proposes a method of secure comparison of two integer secret data between two entities that is less complex than the aforementioned schemes of the prior art.

More particularly, it relates to a cryptographic method of secure comparison of two integer secret data x and y, possessed by a first computing device and by a second computing device respectively, this method comprising:
- a step of generating, by the first computing device, an RSA (Rivest Shamir Adleman) module denoted N;
- a step of computing, by the first computing device, a number C equal to $g^{b^{ax}}h1$ where g is an element of a sub-group G of $\mathbb{Z}_N$ of order $b^d$, h1 is an element of a sub-group H of $\mathbb{Z}_N$ of order f, and a, b, d, and f denote integers such that b and f are mutually prime, and the data x and y are less than d/a;
- a step of sending, by the first computing device, the number C to the second computing device;
- a step of computing, by the second computing device, at least:
  - a number D equal to $C^{u \cdot b^{d-ay}}(gh3)^v h2$ where u and v denote two random integers, and h2 and h3 elements of the sub-group H; and
  - a first fingerprint of $(gh3)^v$ computed using a hash function;
- a step of sending, by the second computing device to the first computing device, the number D and the first fingerprint;
- a step of computing, by the first computing device, the number $(D^f)^{f'}$ where f' is the inverse of f modulo $b^d$;
- a step of obtaining, by the first computing device, on the basis of the number $(D^f)^{f'}$ computed, a second fingerprint using the hash function; and
- a step of determining, by the first computing device, that x is greater than or equal to y or that x is less than y as a function of the result of a comparison between the first fingerprint and the second fingerprint.

In a known manner, an RSA module is an integer number N, the product of two prime integer numbers p and q.

The invention therefore relies on a set of steps implemented by the first computing device and the second computing device.

It also pertains to a determining method, intended to be implemented by a first computing device, possessing and keeping secret an integer datum x, this determining method comprising:
- a step of generating an RSA module denoted N;
- a step of computing a number C equal to $g^{b^{ax}}h1$ where g is an element of a sub-group G of $\mathbb{Z}_N$ of order $b^d$, h1 is an element of a sub-group H of $\mathbb{Z}_N$ of order f, and a, b, d, and f denote integers such that b and f are mutually prime, and the datum x is less than d/a;
- a step of sending the number C to a second computing device possessing and keeping secret an integer datum y, the datum y being less than d/a;
- a step of receiving, from the second computing device, at least:
  - a number D equal to $C^{u \cdot b^{d-ay}}(gh3)^v h2$ where u and v denote two random integers, and h2 and h3 elements of the sub-group H; and
  - a first fingerprint of $(gh3)^v$ computed using a hash function;

a step of computing, by the first computing device, the number $(D^f)^{f'}$ where f' is the inverse of f modulo $b^d$;

a step of obtaining, by the first computing device, on the basis of the number $(D^f)^{f'}$ computed, a second fingerprint using the hash function; and a step of determining, by the first computing device, that x is greater than or equal to y or that x is less than y as a function of the result of a comparison between the first fingerprint and the second fingerprint.

Correspondingly, the invention also relates to a computing device, the so-called first computing device, possessing and keeping secret an integer datum x, this first computing device comprising:

a generating module, configured to generate an RSA module denoted N;

a first computing module, configured to compute a number C equal to $g^{b^a x} h1$ where g is an element of a sub-group G of $\mathbb{Z}_N$ of order $b^d$, h1 is an element of a sub-group H of $\mathbb{Z}_N$ of order f, and a, b, d, and f denote integers such that b and f are mutually prime and the datum x is less than d/a;

a sending module, configured to send the number C to a second computing device possessing and keeping secret an integer datum y, the datum y being less than d/a;

a receiving module, able to receive from the second computing device at least:

a number D equal to $C^{u \cdot b^{d-ay}}(gh3)^v h2$ where u and v denote two random integers, and h2 and h3 elements of the sub-group H; and a first fingerprint of $(gh3)^v$ computed using a hash function;

a second computing module, configured to compute a number $(D^f)^{f'}$ where f' is the inverse off modulo $b^d$;

an obtaining module, configured to obtain on the basis of the number $(D^f)^{f'}$ computed a second fingerprint using the hash function; and a determining module, configured to determine that x is greater than or equal to y or that x is less than y as a function of the result of a comparison between the first fingerprint and the second fingerprint.

The invention also relates to a computing method, intended to be implemented by a computing device, the so-called second computing device, possessing and keeping secret an integer datum y, this computing method comprising:

a step of receiving, from a first computing device possessing and keeping secret an integer datum x, a number C equal to $g^{b^a x} h1$ where g is an element of a sub-group G of $\mathbb{Z}_N$ of order $b^d$, h1 is an element of a sub-group H of $\mathbb{Z}_N$ of order f, and a, b, d, and f denote integer numbers such that b and f are mutually prime and the data x and y are less than d/a;

a step of computing at least:

a number D equal to $C^{u \cdot b^{d-ay}}(gh3)^v h2$ where u and v denote two random integers, and h2 and h3 elements of the sub-group H; and a fingerprint of $(gh3)^v$ computed using a hash function;

a step of sending to the first computing device the number D and the computed fingerprint, to allow the first computing device to determine without knowing y if x is greater than or equal to or less than y.

Correspondingly, the invention also relates to a computing device, the so-called second computing device, possessing and keeping secret an integer datum y, this second computing device comprising:

a receiving module, able to receive from a first computing device possessing and keeping secret an integer datum x, a number C equal to $g^{b^a x} h1$ where g is an element of a sub-group G of $\mathbb{Z}_N$ order $b^d$, h1 is an element of a sub-group H of $\mathbb{Z}_N$ of order f, and a, b, d, and f denote integer numbers such that b and f are mutually prime and the data x and y are less than d/a;

a computing module, configured to compute at least:

a number D equal to $C^{u \cdot b^{d-ay}}(gh3)^v h2$ where u and v denote two random integers, and h2 and h3 elements of the sub-group H; and a fingerprint of $(gh3)^v$ computed using a hash function;

a sending module, configured to send to the first computing device the number D and the computed fingerprint, to allow the first computing device to determine without knowing y if x is greater than or equal to or less than y.

The invention further relates to a cryptographic system able to compare two secret data x and y comprising:

a first computing device according to the invention, possessing and keeping secret the datum x; and a second computing device according to the invention, possessing and keeping secret the datum y.

Optionally, as a function, in particular, of the value of the element h3 and/or of the secret or public nature of the element g, the second computing device can furthermore compute a number D1 which it sends to the first computing device and which is used thereby to obtain the second fingerprint.

The invention therefore proposes a new cryptosystem allowing two entities (computing devices within the meaning of the invention) to compare two data x and y without revealing them, which is based on a single homomorphic encryption algorithm (to which the computing of the number C can be likened) and enjoys the same advantages as the algorithm of Carlton and al. cited previously. This new cryptosystem advantageously requires only two passes between the two computing devices possessing the secret data x and y (each pass corresponding to a sending of data by one of the devices to the other device), and requires no costly computation of discrete logarithms unlike the algorithm of Carlton and al. It has reduced complexity by comparison with the algorithm of Carlton and al. while providing similar security.

This is made possible by the construction of two numbers C and D which take an advantageous form making it possible to limit the interactions between the two entities for deciding what datum is greater than or equal to the other.

More precisely, the numbers C and D computed in accordance with the invention by the first and the second computing device respectively, contain the secret data x and y in a masked form (by one or more masks h1, $(gh3)^v$ and h2), which allows the two computing devices to keep their data secret from one another. These masks are chosen carefully in sub-groups, the order of which is known to the first computing device and used thereby to obtain, on the basis of the number D supplied by the second device (and where applicable an additional number D1), a second fingerprint which, compared to the first fingerprint, makes it possible to directly deduce if x is greater than or equal to y or contrariwise if x is less than y. The use of fingerprints generated using a hash function participates in the security of the method, and allows, thanks to its collision resistance property, the determination of the order of the secrete data x and y via a simple comparison of the first and the second fingerprint, since the probability of two fingerprints computed on the basis of separate data being identical is negligible.

The security of the comparison method is further reinforced by the use of the second computing device, of unknowns u and v which in this capacity have the purpose of remaining unknown to the first computing device. These unknowns advantageously make it possible to avoid a simple exhaustive search conducted on the secret data x and y, to which fingerprint computations are sensitive. The random number u introduced into the computation of D makes it possible to guard against such an attack without however impeding the correct operation of the protocol proposed by the invention. The unknown v meanwhile makes it possible to perfectly mask the order of $(D^f)^{f_1}$ from which the first computing device could deduce information about the secret y of the second computing device.

As mentioned previously, the invention makes it possible, in only two passes between the first and the second computing device, to conclude how the data x and y are positioned with respect to one another. Specifically, given the chosen form of the elements C and D, the first computing device can be reduced, subject to a few mathematical manipulations on the number D allowing it, by making use of the order of the elements h1, h2 and h3 that it knows, to delete from the number D the elements of the sub-group H, to a number $(D^f)^{f_1}$ in which there remains only the element g raised to the power $u \cdot b^{d+ax-ay}+v$. It is hence obvious that if x is greater than or equal to y, g being an element of order $b^d$, $g^{u \cdot b^{d+ax-ay}+v}=g^v$. By making use of this property, the invention allows the first computing device, on the basis of what the second computing device has transmitted to it (i.e. the number D, the fingerprint of $(g \cdot h3)^v$ and where applicable the number D1), to compute a new fingerprint usable and comparable to a certain extent with the fingerprint received from the second computing device in the sense that it allows it to deduce directly (i.e. without any new exchange with the second computing device) in the event of equality, that x is greater than or equal to y (particularly owing to the one-way property of the hash function). There is therefore no need for additional passes between the first computing device and the second computing device to be able to rank the secret data x and y with respect to one another.

Note that according to the situation, the element g can be public (and therefore shared between the first and second computing devices) or contrariwise be kept secret by the first computing device with regard to the second computing device. The choice of keeping the element g secret or not is the result, as will be further detailed below, of a trade-off between security, the sizes of the data that can be compared and computational complexity.

By way of example, in a particular embodiment:
g is a public element;
h3=1;
the second fingerprint is obtained by applying the hash function to the number $(D^f)^{f_1}$ computed.

Specifically, as mentioned above, if x is greater than or equal to y, the number $(D^f)^{f_1}$ is then equal to $g^v$. The second fingerprint obtained by applying the hash function directly to the number $(D^f)^{f_1}$ therefore makes it possible in this case, in the event of equality between the fingerprints, to deduce that x is greater than or equal to y, or that x is less than y in the contrary case.

In another embodiment wherein g is an element kept secret by the first computing device (and therefore unknown to the second computing device):
h3=$h4^e$ where e is an integer kept secret by the first computing device and h4 denotes an element of the sub-group H;
the first computing device sends to the second computing device a number h'=g·h3, this number being used by the second computing device to compute the first fingerprint;
the number D1 computed by the second computing device and sent to the first computing device is equal to $h4^v$; and
the second fingerprint is obtained by applying the hash function to the number $(D^f)^{f_1}$ computed, multiplied by $D1^e$.

The sending, by the second computing device, of the number D1 to the first device and the knowledge that the first device has of the secret e allow it to compute, without knowing the unknown v used by the second device, a number which, for reasons similar to those explained above, is equal to $(gh3)^v$ when x is greater than or equal to y. The second fingerprint obtained by applying the hash function to the number $(D^f)^{f_1}$ multiplied by D1 thus makes it possible in this case, in the event of equality between the fingerprints, to deduce that x is greater than or equal to y, or that x is less than y in the contrary case.

Different values can be chosen for the integers a, b, d, and f, as well as for the random numbers u and v, as a function of the desired level of security.

For example, in a particular embodiment, the integer a is chosen less than or equal to the integer d, and $b^a>2^z$ where z denotes a predetermined security parameter.

The parameter z thus makes it possible to adjust the desired level of security. For example, the parameter z can be chosen equal to 128, to comply with current recommendations in terms of security, notably recommended in the document titled "Recommendation for Key Management", NIST Special Publication 800-57 Part 1 Revision 4.

Moreover, to reinforce security still further, in a particular embodiment, the integer u is chosen at random in the interval [0; $b^a-1$] and the integer v is chosen at random in the interval [0; $b^d-1$].

The intervals defined for the unknowns u and v in this embodiment advantageously make it possible to render negligible the probability of a malicious third party guessing the values of the unknowns u and v.

In a particular embodiment, h1=$h^{r1}$, h2=$h^{r2}$ where r1 is a random integer and r2 is a random integer chosen in the interval [0; $b^{4z}-1$], z denoting a predetermined security parameter.

Using random numbers r1 and r2 makes it possible to reinforce the security of the proposed cryptosystem still further.

In a particular embodiment, the different steps of the determining method and/or the computing method are determined by computer program instructions.

Consequently, the invention also pertains to a computer program on an information medium, this program being able to be implemented in a computing device (first or second computing device within the meaning of the invention) or more generally in a computer, this program including instructions suitable for implementing the steps of a determining method and/or a computing method as described above.

This program can use any programming language, and be in the form of source code, object code, or intermediate code between source code and object code, such as in a partly compiled form, or in any other desirable form.

The invention also pertains to an information or recording medium readable by a computer, and including instructions of a computer program as mentioned above.

The information or recording medium can be any entity or device capable of storing the program. For example, the medium can consist of a storage means, such as a ROM, for example a CD-ROM or a microelectronic circuit ROM, or else a magnetic recording means, for example a diskette (floppy disk) or a hard disk.

Moreover, the information or recording medium can be a transmissible medium such as an electrical or optical signal, which can conveyed via an electrical or optical cable, by radio or by other means. The program according to the invention can in particular be downloaded over a network of Internet type.

Alternatively, the information or recording medium can be an integrated circuit into which the program is incorporated, the circuit being suitable for executing or being used in the execution of the method in question.

It is also possible to envisage, in other embodiments, that the comparison method, the computing method, the determining method, the first and the second computing device and the cryptographic system according to the invention have in combination all or part of the aforementioned features.

BRIEF DESCRIPTION OF THE DRAWINGS

Other features and advantages of this invention will become apparent from the description given below, with reference to the appended drawings which illustrate an exemplary embodiment thereof devoid of any limitation. In the figures.

DETAILED DESCRIPTION OF THE INVENTION

Figure 1:
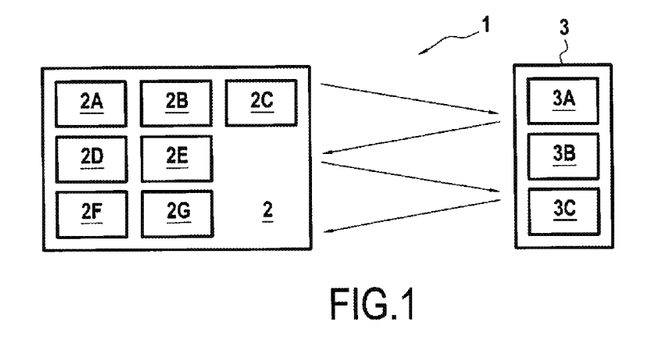
FIG. 1 schematically represents a cryptographic system in accordance with the invention, in a particular embodiment.

FIG. 1 represents, in its environment, a cryptographic system 1 in accordance with the invention, in a particular embodiment.

The cryptographic system 1 is designed so as to allow the production of two integer data x and y respectively possessed by two separate entities 2 and 3 while allowing each of these entities to keep secret the datum it possesses with regard to the other entity. In other words, the secret data can be compared thanks to the cryptographic system 1 without the entity 2 needing to reveal to the entity 3 the datum x and conversely, without the entity 3 needing to reveal to the entity 2 the datum y.

Here the two entities 2 and 3 are computing devices in accordance with the invention. In the example illustrated in FIG. 1, the entity 2 is a "first" computing device within the meaning of the invention, in the sense that it is this device that determines the result of the comparison of the two secret data x and y, and the entity 3 is a "second" computing device within the meaning of the invention.

No limitation is attached to the context in which the cryptographic system 1 and correspondingly the two entities 2 and 3 are led to make this comparison. As previously mentioned, the comparison of two secret integer data is a task that is found in many algorithms used in various fields (healthcare, cybersecurity, finance etc.) and particularly in machine learning algorithms based on ranking techniques requiring the comparison of integers in a secure manner. Other types of algorithm also make use of the comparison of integers, such as for example the algorithms used in certain electronic voting systems (in particular when it is desirable to determine who is the winner of an election without revealing the respective scores of the different candidates), or secret electronic auctions (the offers of the bidders are then encrypted to remain secret, and it is desirable to determine who has made the best bid but without having to reveal the bids of the other bidders etc.)

Figure 2:
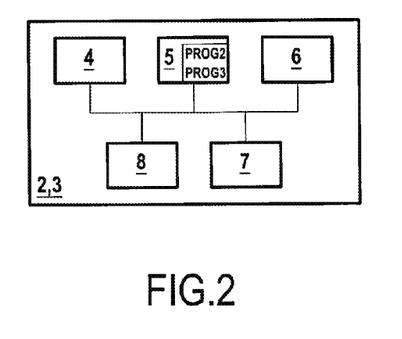
FIG. 2 schematically illustrates the hardware architecture of a first computing device and a second computing device of the cryptographic system of FIG. 1, in accordance with the invention, in a particular embodiment.

In the example envisioned in FIG. 1, the computing devices 2 and 3 are computers, the architecture of which is schematically illustrated in FIG. 2.

Each computing device comprises in particular a processor 4, a read-only memory 5, a random-access memory 6, a non-volatile memory 7 (in which is stored for example the secret datum x for the computing device 2 and y for the computing device 3) and communication means 8. The communication means 8 allow the devices 2 and 3 to communicate with one another, to exchange various elements with one another, described in more detail below. They may interchangeably comprise a wireless or wired interface etc.

The read-only memory 5 of the computing device 2 and the computing device 3 constitutes a recording medium in accordance with the invention, readable by the processor 4 and on which is recorded a computer program PROG2 and PROG3 respectively, in accordance with the invention, respectively including, for the computing device 2, instructions for executing the steps of the determining method according to the invention and for the computing device 3 instructions for executing the steps of the computing method according to the invention.

More precisely, the computer program PROG2 defines via its instructions a number of functional modules of the computing device 2 able to implement the steps of the determining method and relying on the hardware elements 4-8 of the computing device 2. These functional modules in particular comprise, in the embodiment described here, as illustrated in FIG. 1, a generating module 2A, a first computing module 2B, a sending module 2C, a receiving module 2D, a second computing module 2E, an obtaining module 2F, and a determining module 2G.

Similarly, the computer program PROG3 defines via its instructions a number of functional modules of the computing device 3 able to implement the steps of the computing method and relying on the hardware elements 4-8 of the computing device 3. These functional modules in particular comprise, in the embodiment described here, as illustrated in FIG. 1, a receiving module 3A, a computing module 3B and a sending module 3C.

The functions of the different modules of the computing device 2 and of the computing device 3 are further specified below.

In another embodiment, one and/or the other of the computing devices 2 and 3 incorporate a silicon chip and means for communicating with the other devices of the cryptographic system 1 in particular. The silicon chip comprises transistors suitable for constituting logic gates of a non-programmable wired logic device for executing the steps of the determining method and/or the computing method according to the invention.

Figure 3:
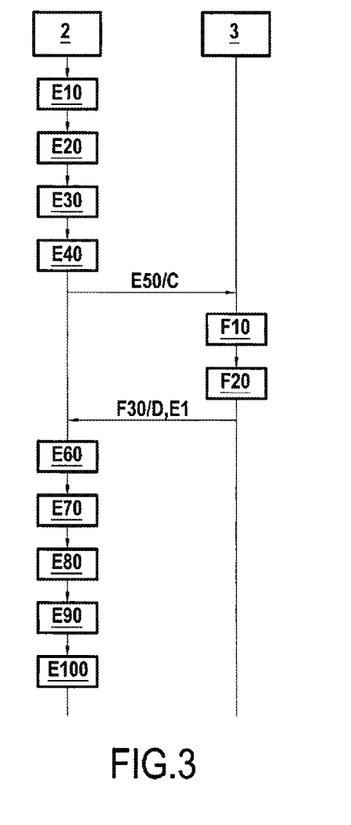
FIG. 3 represents in the form of a flow diagram the main steps of a comparison method according to the invention as it is implemented by the cryptographic system of FIG. 1, in a first embodiment.
Figure 4:
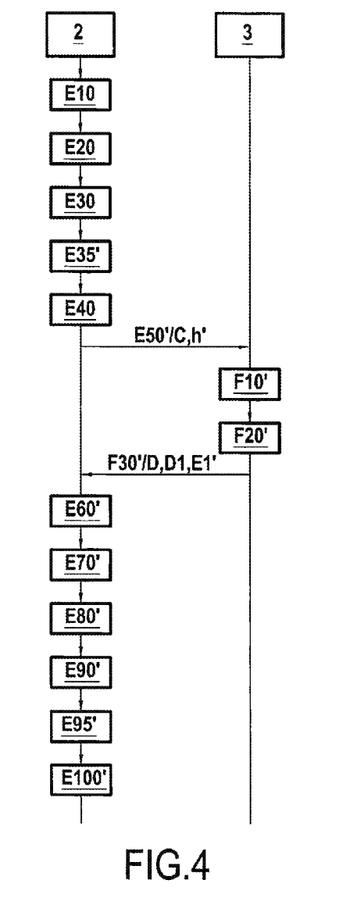
FIG. 4 represents in the form of a flow diagram the main steps of a comparison method according to the invention as it is implemented by the cryptographic system of FIG. 1, in a second embodiment.

We will now describe, with reference to FIGS. 3 and 4, the main steps of the cryptographic comparison method according to the invention, in two particular embodiments. This cryptographic method relies on the steps of the determining method implemented by the computing device 2 (subsequently referred to in the description as Exx or Exx') and on the steps of the computing method implemented by the computing device 3 (referred to in the rest of the description as Fxx or Fxx'). It makes it possible, as previously emphasized, for the computing device 2 to determine the position of the secret data x and y with respect to one another without the computing device 2 and the computing device 3 having to reveal the secret datum x or y that it possesses, and does this in only two passes of exchanges between these two devices.

The two embodiments illustrated in FIGS. 3 and 4 correspond to two different versions of the cryptographic comparison method which take into account the public or secret nature of one of the parameters of the method, and more particularly of the element g further described below.

Thus, FIG. 3 represents the main steps of the cryptographic comparison method according to the invention in a first embodiment in which the element g is public.

In accordance with the invention, the computing device 2, via its generating module 2A, generates an RSA module denoted N (step E10), the product of two natural integers (i.e. belonging to the set N of positive or non-zero integers) p and q, which are primes, and which the computing device 2 keeps secret. The term "secret" is understood to mean in this description that the computing device 2 does not make the element in question public and in particular that the computing device 3 does not have knowledge of it (and conversely when an element is kept secret by the computing device 3).

In the embodiment described here, the computing device 2, for example by way of its generating module 2A, further chooses natural integers denoted a, b, d, and f here verifying the following conditions (step E20):

a≤d and $b^a > 2^z$ where z denotes a predetermined security parameter. For example, z=128 to comply with the security recommendations recommended in the document titled "Recommendation for Key Management", NIST Special Publication 800-57 Part 1 Revision 4;

the data x and y to be compared are less than d/a; and f is prime with b.

Note that the first condition is optional and has the aim of guaranteeing a level of security given to the secure comparison carried out using the invention (corresponding to the value of the parameter z chosen).

It is supposed that the RSA module N as well as the integers a, b, and d are made public by the computing device 2 (and therefore in particular shared with the computing device 3).

The integer f is however kept secret by the computing device 2.

Note that it is still possible reduce the data to be compared to less than $$\frac{d}{a}.$$

If this is not the case of the data initially considered, these can be segmented into several blocks each representing an integer less than $$\frac{d}{a},$$

for example similar or identical to that described in the document by Carlton and al. previously cited. The comparison of the initial data is then made by the pairwise comparison of the data corresponding to each block in accordance with the invention.

In a variant, the integers a, b, and d can be chosen by another entity than the computing device 2 and be made public by this entity so that the computing devices 2 and 3 have knowledge thereof.

The computing device 2 also selects, here still by way of its generating module 2A, an element g of a sub-group G of $\mathbb{Z}_N$ of order $b^d$ and an element h of a sub-group H of $\mathbb{Z}_N$ of order f (step E30). Thus, by definition, the elements g and h verify the following equalities:

$$g^{b^d} \mod N = 1$$

$$h^f \mod N = 1$$

where mod means modulo.

In the first embodiment described here, as mentioned previously, the element g is public, and therefore shared by the computing device 2 with the computing device 3. The element h is however kept secret by the computing device 3, particularly with regard to the computing device 2. It allows the first computing device 2 to mask its secret datum x, as detailed hereinafter.

The computing device 2 then computes, by means of its first computing module 2B, a number C defined by (step E40):

$$C = g^{b^{ax}} h1$$

where h1 is an element of the sub-group H (consequently of order f).

Note that as the secret datum x is by definition less than d/a, the number C is sure to not have a value of one, which makes it possible to ensure the correct operation of the protocol.

In the example envisioned here, the first computing module 2B chooses h1 equal to $h^{r1}$ where r1 is a natural integer chosen at random by the first computing module 2B. Of course this example is only given by way of illustration. The random integer r1 is kept secret by the computing device 2 with regard to the computing device 3. Note that for this purpose, it can be quite simply erased from the memory of the computing device 2 just after being used for the computation of the number C.

The computing device 2 then sends, via its sending module 2C and its communication means 8, the number C thus computed to the computing device 3 (step E50).

On receiving the number C via its receiving module 3A and its communication means 8 (step F10), the computing device 3 computes, by way of its computing module 3B, a number D equal to (step F20):

$$D = C^{u \cdot b^{d-ay}} (gh3)^v h2$$

where u and v denote two random natural integers, and h2 and h3 elements of the sub-group H.

In the first embodiment described here, h3=1 and h2=h'$^{r2}$ where r2 is a random natural integer chosen in the interval [0; b$^{4z}$−1]. Note however that this example for the choice of h2 and h3 is only given by way of illustration, and is not limiting per se. In particular, in the first embodiment, given the public nature of the element g, by taking h3=1, it is chosen not to mask this element for the sake of simplicity. However, this hypothesis is not limiting per se and other strategies can be envisioned.

Note that the choice of the interval [0; b$^{4z}$−1] for selecting the unknown r2 is not limiting per se and other intervals may be envisioned. This interval does however make it possible to guarantee a certain security of the comparison method, compatible with the recommendations made in the document "Recommendation for Key Management", mentioned previously.

The random integers u, v, and r2 are kept secret by the computing device 2 with regard to the computing device 3. Note that for this purpose, like the unknown r1 previously, they can be quite simply erased from the memory of the computing device 3 just after being used for the computation of the number D.

In the first embodiment described here wherein the element g is public and h3=1, the number D computed by the computing module 3B is therefore defined in an equivalent manner by:

$$D = C^{u \cdot b^{d-ay}} g^v h'^{r2}$$

The computing module 3B also computes, during the step F20, a fingerprint denoted E1 (first fingerprint withing the meaning of the invention) of the number (gh3)$^v$=g$^v$ using, in a manner known per se, a hash function denoted HASH. Such a function is known to those skilled in the art and is not described in further detail here. Examples of hash functions are the functions SHA 256 and SHA 512 as defined in the document "Secure Hash Standard", FIPS PUB 180-4 published in August 2015 by the NIST.

More particularly, to compute the fingerprint E1, the computing module 3B here directly applies the hash function HASH on the number g$^v$, i.e.:

$$E1 = \text{HASH}(g^v)$$

Then the computing device 3 sends, via its sending module 3C and its communicating means 8, the number D and the fingerprint E1 to the computing device 2 (step F30).

Note that the sending steps E50 and F30 respectively constitute a first and a second pass between the computing devices 2 and 3 of the comparing method according to the invention.

On receiving the number D and the fingerprint E1 via its receiving module 2D and its communication means 8 (step E60), the computing device 2 performs various mathematic manipulations on the number D via its second computing module 2E for computing a fingerprint E2 (second fingerprint within the meaning of the invention), which it can compare with the fingerprint E1 supplied by the second computing device 3 to determine if x is greater than or equal to y or if x is less than y.

More specifically, the second computing module 2E first raises the number D to the power f, f denoting, as a reminder, the order of the elements of the sub-group of H (step E70). It then obtains:

$$D^f = (C^{u \cdot b^{d-ay}} g^v h'^{r2})^f$$

i.e. by replacing C by $g^{b^{ax}}h^{r1}$ and writing $(g^{n1})^{n2} = g^{n1 \cdot n2} = (g^{n2})^{n1}$ if n1 and n2 denote two numbers:

$$D^f = (g^f)^{ub^{d+ax-ay}+v}(h^f)^{r1 ub^{d-ay}+r2}$$

The element h being of order f, this means that h$^f$=1, in other words, after the computing step E70, the second computing module 2E obtains the number Dr which can be written in the form:

$$D^f = (g)^{ub^{d+ax-ay}+v}$$

The raising to the power f of the number D also allows the second computing module 2E to eliminate the h terms of the number D, or more generally all the elements contained in the number D belonging to the sub-group H. In other words here, it removes from the number D all the h elements raised to a certain power by relying on the knowledge of the order f elements of the sub-group H. Note that the order f elements of the sub-group H can, in a known manner, be obtained on the basis of the prime numbers p and q of the RSA module N (and more precisely the factorization of p−1 and q−1).

The second computing module 2E then raises the result obtained for the computation of Dr to the power f' where f' denotes the inverse of f modulo b$^d$ (step E80). In other words:

$$ff' = 1 \bmod b^d$$

It then obtains a result that can be written in the form:

$$(D^f)^{f'} = ((g^f)^{ub^{d+ax-ay}+v})^{f'} = (g^{ff'})^{ub^{d+ax-ay}+v} = g^{ub^{d+ax-ay}+v}$$

Then the obtaining module 2F of the computing device 2 computes a fingerprint, denoted E2 of the result obtained using the hash function HASH (step E90), i.e.:

$$E2 = \text{HASH}((D^f)^{f'})$$

which can be written in an equivalent manner in the form:

$$E2 = \text{HASH}(g^{ub^{d+ax-ay}+v}) \qquad (1)$$

Note that the computing step E80 can be carried out interchangeably by the computing module 2E or by the obtaining module 2F of the computing device 2.

By relying on the relationship (1) above, the comparing module 2G of the computing device 2 compares the fingerprints E1 and E2 (step E100), and as a function of the result of the comparison determines how the secret datum x is situated with respect to the secret datum y without the first and the second device needing to reveal the data x and y. More precisely, the comparing module 2G determines here, with the conventions adopted, that:

x is greater than or equal to y if E1=E2; or that x is less than y if E1≠E2.

Specifically, starting from the relationship (1), it appears that if x is greater than or equal to y, then d+ax−ay≤d and the term $g^{ub^{d+ax-ay}+v}$ reduces to g$^v$, g being of order b$^d$. Computing the fingerprint E2 therefore equates to computing the fingerprint g$^v$, which by definition corresponds to the fingerprint E1 computed and transmitted by the computing device 3.

Conversely, the relationship (1), if x is less than y, it cannot be concluded that $g^{ub^{d+ax-ay}} = 1$. But the collision resistance property of the hash functions, which ensures that two fingerprints of separate values have a negligible probability of being equal, does however make it possible to conclude that if E1≠E2, this means that x is indeed less than y.

In the first embodiment described here, we have supposed that the element g selected by the computing device 2 is public, and known to the computing device 3. FIG. 4 represents the main steps of the cryptographic comparison method according to the invention in a second embodiment wherein the element g is kept secret by the computing device 2 and is therefore not known to the computing device 3. In FIG. 4, the steps of the second embodiment which are identical to those of the first embodiment are given the same reference number and will not be described again in detail.

In the second embodiment as in the first embodiment, the computing device 2, via its generating module 2A, generates an RSA module denoted N (step E10), the product of two mutually prime natural integers p and q and which the computing device 2 keeps secret.

The computing device 2 moreover chooses natural integers denoted a, b, d, and f verifying the following hypotheses (step E20):

a≤d and $b^a > 2^z$ where z denotes a predetermined security parameter (integer). For example z=128 to comply with the security recommendations in the document titled "Recommendation for Key Management", NIST Special Publication 800-57 Part 1 Revision 4;

the data x and y to be compared are less than d/a; and f is prime with b.

The RSA module N and the integers a, b, and d are made public by the computing device 2 and the integer f is kept secret.

The computing device 2 also selects, here still by way of its generating module 2A, an element g of a sub-group G of $\mathbb{Z}_N$ of order $b^d$ and an element h of a sub-group H of $\mathbb{Z}_N$ of order f (step E30). By definition, the elements g and h verify the following equalities:

$$g^{b^d} \bmod N = 1$$

$$h^f \bmod N = 1$$

where mod means modulo.

In the second embodiment, the element g is kept secret by the computing device 2 just like the element h. To take into account this restriction, the computing device 2, for example via its generating module 2A, generates on the basis of the element g an element h' verifying the following relationship (step E35'):

$$h' = gh4^e$$

where h4 is an element of the sub-group H, and e denotes an integer selected and kept secret by the computing device 2. In the example envisioned here, for the sake of simplicity, the generating module 2A takes h4=h, but this example is only given as an illustration.

Next, the computing device 2 computes, by means of its first computing module 2B, as in the first embodiment, the number C defined by (step E40):

$$C = g^{b^{ax}} h1$$

where h1 is an element of the sub-group H (consequently of order f). In the example envisioned here, the first computing module 2B chooses h1 equal to $h^{r1}$ where r1 is a natural integer chosen at random. The random integer r1 is kept secret by the computing device 2 with regard to the computing device 3 (for example by being quite simply erased from its memory after being used to compute C).

The computing device 2 then sends via its sending module 2C and its communication means 8 the number C and the number h' to the computing device 3 (step E50').

On receiving the numbers C and h' via its receiving module 3A and its communication means 8 (step F10'), the computing device 3 computes as in the first embodiment, by way of its computing module 3B, a number D defined by (step F20'):

$$D = C^{u \cdot b^{d-ay}} (gh3)^v h2$$

where u and v denote two random natural integers, and h2 and h3 elements of the sub-group H. More specifically, in the second embodiment described here, for the sake of simplicity, the computing module 3B chooses $h3 = h4^e$ (which allows it to directly reuse h' received from the computing device 2) and $h2 = h^{r2}$ where r2 is a random integer chosen in the interval [0; $b^{4z}-1$].

Note that the condition according to which the datum y is less than d/a guarantees that the computing device 3 is still capable of computing the element D.

The random integers u, v, and r2 are kept secret by the computing device 2 with regard to the computing device 3 as in the first embodiment.

In the second embodiment described here where the element g is secret and therefore not known to the computing device 3, the number D computed by the computing module 3B is therefore defined in an equivalent manner by:

$$D = C^{u \cdot b^{d-ay}} (gh4^e)^v h^{r2}$$

Moreover, in the second embodiment, the computing module 3B also computes in the step F20 a fingerprint denoted E1' (first fingerprint within the meaning of the invention) of the number $(gh3)^v = (gh4^e)^v$ using a hash function HASH. More specifically, the computing module 3B computes the fingerprint E1' by directly applying the hash function HASH to the number $(gh4^e)^v$ that it has received from the computing device 2, i.e.:

$$E1' = \mathrm{HASH}((gh4^e)^v)$$

In this second embodiment, to "compensate" for the fact that the element g is kept secret by the computing device 2, the computing device 3 computes an additional number, denoted D1. As will be described in more detail below, this number D1 is intended to allow the computing device 2 to compute a second fingerprint comparable with the fingerprint E1' without knowing the unknown v which allows it to determine the order of the secret data x and y. More precisely, in the example envisioned here where $h3 = h4^e$, the number D1 is defined by:

$$D1 = h4^v;$$

Then the computing device 3 sends, via its sending module 3C and its communication means 8, the numbers D and D1, and the fingerprint E1' to the computing device 2 (step F30').

On receiving the numbers D and D1 as well as the fingerprint E1 via its receiving module 2D and its communication means 8 (step E60'), the computing device 2 performs various mathematical manipulations on the number D via its second computing module 2E to compute a fingerprint E2' (second fingerprint within the sense of the invention), that it can compare with the fingerprint E1' supplied by the second computing device 3 to determine if x is greater than or equal to y or if x is less than y.

More specifically, the second computing module 2E first raises the number D to the power f, f denoting as a reminder the order of the elements of the sub-group of H (step E70'). It then obtains:

$$D^f = (C^{u \cdot b^{d-ay}} (gh4^e)^v h^{r2})^f$$

either by replacing C by $h^{r1}$ and by writing $(g^{n1})^{n2}=g^{n1 \cdot n2}=(g^{n2})^{n1}$ if n1 and n2 denote two integer numbers:

$$D^f=(g^f)^{ub^{d+ax-ay}+v}(h^f)^{r1ub^{d-ay}+r2+ev}$$

The element h being of order f this means that $h^f=1$, in other words, after the computing step E70, the second computing module 2E obtains the number $D^f$ which can be written in the form:

$$D^f=(g^f)^{ub^{d+ax-ay}+v}$$

The raising to the power f of the number D thus allows the second computing module 2E to eliminate the h terms in the number D, or more generally all the elements contained in the number D belonging to the sub-group H.

As in the first embodiment, the second computing module 2E then raises the result obtained for the computation of Dr to the power f' where f' denotes the inverse of f modulo $b^d$ (step E80'). In other words:

$$ff'=1 \bmod b^d$$

It then obtains a result that can be written in the form:

$$(D^f)^{f'}=((g^f)^{ub^{d+ax-ay}+v})^{f'}=(g^{ff'})^{ub^{d+ax-ay}+v}=g^{ub^{d+ax-ay}+v}$$

Then the second computing module 2E multiplies the result obtained for $(D^f)^{f'}$ by the number $(D1)^e$ (step E90'). This multiplication allows the computing device 2 to compensate for the lack of knowledge by the computing device 3 of the element g and to take into account the fingerprint computed thereby, no longer on the element $g^v$ as in the first embodiment, but on the element $(gh4^e)^v=(gh^e)^v$.

Then the obtaining module 2F of the computing device 2 computes a fingerprint, denoted E2' by applying the hash function HASH to the result obtained (step E95'), i.e.

$$E2'=\text{HASH}((D^f)^{f'}(D1)^e)$$

which can be written in an equivalent manner in the form:

$$E2'=\text{HASH}(g^{ub^{d+ax-ay}}(gh^e)^v) \quad (2)$$

By relying on the relationship (2) above, the comparing module 2G of the computing device 2 compares the fingerprints E1' and E2' (step E100'), and as a function of the result of the comparison determines how the secret datum x is situated with respect to the secret datum y without the first and the second device needing to reveal the data x and y. More precisely, the comparing module 2G here determines, with the conventions adopted, that:

x is greater than or equal to y if E1'=E2'; or that x is less than y if E1'≠E2'.

Specifically, starting from the relationship (2), it appears that if x is greater than or equal to y, then $d+ax-ay \geq d$ and the term $g^{ub^{d+ax-ay}}$ reduces to 1, g being of order $b^d$. Computing the fingerprint E2' therefore equates to computing the fingerprint of $(gh^e)^v$, which by definition corresponds to the fingerprint E1' computed and transmitted by the computing device 3.

Conversely, the relationship (2), if x is less than y, it cannot be concluded that $g^{ub^{d+ax-a}}=1$. But the collision resistance property of the hash functions, which ensures that two fingerprints of separate values have a negligible probability of being equal, does however make it possible to conclude that if E1'≠E2', this means that x is indeed less than y.

In the preceding description, two embodiments are envisioned according to whether the element g is kept secret or not by the computing device 2. Note that the choice to keep g secret or otherwise can have consequences on the different parameters of the comparison method and on its efficiency.

By way of illustration, in the first embodiment where the element g is public, the guarantee of a certain level of security, typically that recommended by the recommendations mentioned previously, can impose certain conditions on the choice of the parameters. Thus, for example, it is preferable to make sure that $b^d < N^{1/4}$, which can limit the value of the integer d, and therefore correspondingly the size of the secret data x and y that can be compared.

In the second embodiment where the element g is kept secret, the restriction on the integer d to achieve a similar level of security is less heavy, i.e. it is preferable to make sure that $b^d \cdot 2^{256} < N^{1/2}$. But it is also preferable in this case that the prime integers p and q chosen by the computing device 2 to generate the RSA module N are of sufficient size, for example 3072 bits, which is double the standard size of the integers generally considered for generating an RSA module. With comparable parameters, this second embodiment therefore makes it possible to process numbers twice as large as the first embodiment but entails more computation than the first embodiment.

The choice of keeping the element g secret or not is thus a result of a trade-off between security, the size of the data that can be compared and computational complexity.

The invention claimed is:

1. A cryptographic method of securely comparing two secret integer data x and y, possessed by a first computing device and by a second computing device, respectively, said method comprising:

generating, by the first computing device, a Rivest Shamir Adleman (RSA) module denoted N;

computing, by the first computing device, a number C equal to $g^{b^a}$h1 where g is an element of a sub-group G of $\mathbb{Z}_N$ of order $b^d$, h1 is an element of a sub-group H of $\mathbb{Z}_N$ of order f, and a, b, d, and f denote integers such that b and f are mutually prime, and the data x and y are less than d/a;

sending, by the first computing device, the number C to the second computing device;

computing, by the second computing device, at least:

a number D equal to $C^{u \cdot b^{d-a y}}(gh3)^v$h2 where u and v denote two random integers, and h2 and h3 elements of the sub-group H; and a first fingerprint of $(gh3)^v$ computed using a hash function;

sending, by the second computing device to the first computing device, the number D and the first fingerprint;

computing, by the first computing device, the number $(D^f)^{f'}$ where f' is the inverse of f modulo $b^d$;

obtaining, by the first computing device, on the basis of the number $(D^f)^{f'}$ computed, a second fingerprint using the hash function; and determining, by the first computing device, that the data x is greater than or equal to the data y or that the data x is less than the data y as a function of the result of a comparison between the first fingerprint and the second fingerprint and without revealing the data x to the second computing device and the data y to the first computing device.

2. The cryptographic method as claimed in claim 1 further comprising computing, by the second computing device, a number D1 and sending D1 to the first computing device, which is used thereby to obtain the second fingerprint.

3. The cryptographic method as claimed in claim 1 wherein:

g is a public element;

h3=1; and the second fingerprint is obtained by applying the hash function to the number $(D^f)^{f'}$ computed.

4. The cryptographic method as claimed in claim 2 wherein:
   g is an element kept secret by the first computing device and $h3=h4^e$ where e is an integer kept secret by the first computing device and h4 denotes an element of the sub group H;
   the first computing device sends to the second computing device a number $h'=g \cdot h3$, this number being used by the second computing device to compute the first fingerprint;
   the number D1 computed by the second computing device and sent to the first computing device is equal to $h4^v$; and
   the second fingerprint is obtained by applying the hash function to the number $(D^{f'})^{f'}$ computed, multiplied by $D1^e$.

5. The cryptographic method as claimed in claim 1 wherein the integer a is chosen less than or equal to the integer d, and $b^a > 2^z$ where z denotes a predetermined security parameter.

6. The cryptographic method as claimed in claim 1 wherein the integer u is chosen at random in the interval $[0; b^a-1]$ and the integer v is chosen at random in the interval $[0; b^d-1]$.

7. A first computing device possessing and keeping secret an integer datum x, said first computing device comprising:
   a processor; and
   a non-transitory computer-readable medium comprising instructions stored thereon, which when executed by the processor configure the first computing device to:
   generates a Rivest Shamir Adleman (RSA) module denoted N;
   compute a number C equal to $g^{b^{ax}} h1$ where g is an element of a sub-group G of $\mathbb{Z}_N$ of order $b^d$, h1 is an element of a sub-group H of $\mathbb{Z}_N$ of order f, and a, b, d, and f denote integers such that b and f are mutually prime and the datum x is less than d/a;
   send the number C to a second computing device possessing and keeping secret an integer datum y, the datum y being less than d/a;
   receive from the second computing device at least:
   a number D equal to $C^{u \cdot b^{d-ay}}(gh3)^v h2$ where u and v denote two random integers, and h2 and h3 elements of the sub-group H; and
   a first fingerprint of $(gh3)^v$ computed using a hash function;
   compute a number $(D^{f'})^{f'}$ where f' is the inverse of f modulo $b^d$;
   obtain on the basis of the number $(D^{f'})^{f'}$ computed a second fingerprint using the hash function; and
   determine that x is greater than or equal to y or that x is less than y as a function of the result of a comparison between the first fingerprint and the second fingerprint and without possessing the data y and without revealing the data x to the second computing device.

8. A second computing device possessing and keeping secret an integer datum y, said second computing device comprising:
   a processor; and
   a non-transitory computer-readable medium comprising instructions stored thereon, which when executed by the processor configure the second computing device to:
   receive from a first computing device possessing and keeping secret an integer datum x, a number C equal to $g^{b^{ax}} h1$ where g is an element of a sub-group G of $\mathbb{Z}_N$ of order $b^d$, h1 is an element of a sub-group H of $\mathbb{Z}_N$ of order f, and a, b, d, and f denote integer numbers such that b and f are mutually prime and the data x and y are less than d/a;
   compute at least:
   a number D equal to $C^{u \cdot b^{d-ay}}(gh3)^v h2$ where u and v denote two random integers, and h2 and h3 elements of the sub-group H; and
   a fingerprint of $(gh3)^v$ computed using a hash function; and
   send to the first computing device the number D and the computed fingerprint, to allow the first computing device to determine, without knowing y, if x is greater than or equal to y or if x is less than y.

9. A determining method, implemented by a first computing device, possessing and keeping secret an integer datum x, said determining method comprising:
   generating a Rivest Shamir Adleman (RSA) module denoted N;
   computing a number C equal to $g^{b^{ax}} h1$ where g is an element of a sub-group G of $\mathbb{Z}_N$ of order $b^d$, h1 is an element of a sub-group H of $\mathbb{Z}_N$ of order f, and a, b, d, and f denote integers such that b and f are mutually prime, and the datum x is less than d/a;
   sending the number C to a second computing device possessing and keeping secret an integer datum y, the datum y being less than d/a;
   receiving, from the second computing device, at least:
   a number D equal to $C^{u \cdot b^{d-ay}}(gh3)^v h2$ where u and v denote two random integers, and h2 and h3 elements of the sub-group H; and
   a first fingerprint of $(gh3)^v$ computed using a hash function;
   computing, by the first computing device, the number $(D^{f'})^{f'}$ where f' is the inverse of f modulo $b^d$;
   obtaining, by the first computing device, on the basis of the number $(D^{f'})^{f'}$ computed, a second fingerprint using the hash function; and
   determining, by the first computing device, that x is greater than or equal to y or that x is less than y as a function of the result of a comparison between the first fingerprint and the second fingerprint and without possessing the data y and without revealing the data x to the second computing device.

10. A computing method, implemented by a second computing device, possessing and keeping secret an integer datum y, said computing method comprising:
    receiving, from a first computing device possessing and keeping secret an integer datum x, a number C equal to $g^{b^{ax}} h1$ where g is an element of a sub-group G of $\mathbb{Z}_N$ of order $b^d$, h1 is an element of a sub-group H of $\mathbb{Z}_N$ of order f, and a, b, d, and f denote integer numbers such that b and f are mutually prime and the data x and y are less than d/a;
    computing at least:
    a number D equal to $C^{u \cdot b^{d-ay}}(gh3)^v h2$ where u and v denote two random integers, and h2 and h3 elements of the sub-group H; and
    a fingerprint $o(gh3)^v$ computed using a hash function; and
    sending to the first computing device the number D and the computed fingerprint, to allow the first computing device to determine, without knowing y, if x is greater than or equal to y or if x is less than y.

11. A non-transitory computer-readable medium comprising instructions stored thereon for executing determining method when said program is executed by a processor of a first computing device, possessing and keeping secret an integer datum x, wherein the instructions configure the first computing device to:

generates a Rivest Shamir Adleman (RSA) module denoted N;

compute a number C equal to $g^{b^{ax}}h1$ where g is an element of a sub-group G of $\mathbb{Z}_N$ of order $b^d$, h1 is an element of a sub-group H of $\mathbb{Z}_N$ of order f, and a, b, d, and f denote integers such that b and f are mutually prime and the datum x is less than d/a;

send the number C to a second computing device possessing and keeping secret an integer datum y, the datum y being less than d/a;

receive from the second computing device at least:

a number D equal to $C^{u \cdot b^{d-ay}}(gh3)^v h2$ where u and v denote two random integers, and h2 and h3 elements of the sub-group H; and a first fingerprint of $(gh3)^v$ computed using a hash function;

compute a number $(D^f)^{f'}$ where f' is the inverse of f modulo $b^d$;

obtain on the basis of the number $(D^f)^{f'}$ computed a second fingerprint using the hash function; and determine that x is greater than or equal to y or that x is less than y as a function of the result of a comparison between the first fingerprint and the second fingerprint and without possessing the data y and without revealing the data x to the second computing device.

12. A non-transitory computer-readable medium comprising instructions stored thereon for executing a computing method when said program is executed by a processor of a second computing device, possessing and keeping secret an integer datum y, wherein the instructions configure the second computing device to:

receive from a first computing device possessing and keeping secret an integer datum x, a number C equal to $g^{b^{ax}}h1$ where g is an element of a sub-group G of $\mathbb{Z}_N$ of order $b^d$, h1 is an element of a sub-group H of $\mathbb{Z}_N$ of order f, and a, b, d, and f denote integer numbers such that b and f are mutually prime and the data x and y are less than d/a;

compute at least:

a number D equal to $C^{u \cdot b^{d-ay}}(gh3)^v h2$ where u and v denote two random integers, and h2 and h3 elements of the sub-group H; and a fingerprint of $(gh3)^v$ computed using a hash function; and send to the first computing device the number D and the computed fingerprint, to allow the first computing device to determine, without knowing y, if x is greater than or equal to y or if x is less than y.

13. A data processing method of securely comparing two secret integer data x and y, possessed by a first computing device and by a second computing device, respectively, said method comprising:

generating, by the first computing device, a Rivest Shamir Adleman (RSA) module denoted N;

computing, by the first computing device, a number C equal to $g^{b^{ax}}h1$ where g is an element of a sub-group G of $\mathbb{Z}_N$ of order $b^d$, h1 is an element of a sub-group H of $\mathbb{Z}_N$ of order f, and a, b, d, and f denote integers such that b and f are mutually prime, and the data x and y are less than d/a;

sending, by the first computing device, the number C to the second computing device;

computing, by the second computing device, at least:

a number D equal to $C^{u \cdot b^{d-ay}}(gh3)^v h2$ where u and v denote two random integers, and h2 and h3 elements of the sub-group H; and a first fingerprint of $(gh3)^v$ computed using a hash function;

sending, by the second computing device to the first computing device, the number D and the first fingerprint;

computing, by the first computing device, the number $(D^f)^{f'}$ where f' is the inverse of f modulo $b^d$;

obtaining, by the first computing device, on the basis of the number $(D^f)^{f'}$ computed, a second fingerprint using the hash function; and determining, by the first computing device, that the data x is greater than or equal to the data y or that the data x is less than the data y as a function of the result of a comparison between the first fingerprint and the second fingerprint and without revealing the data x to the second computing device and the data y to the first computing device.

* * * * *